(12) United States Patent
Sun et al.

(10) Patent No.: US 12,256,061 B2
(45) Date of Patent: Mar. 18, 2025

(54) CALIBRATION VERIFICATION METHOD FOR CAMERA INTRINSIC PARAMETER AND APPARATUS, DEVICE, AND MEDIUM

(71) Applicant: Beijing Zitiao Network Technology Co., Ltd., Beijing (CN)

(72) Inventors: Xi Sun, Beijing (CN); Hengkai Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/560,030

(22) PCT Filed: Apr. 24, 2022

(86) PCT No.: PCT/CN2022/088716
§ 371 (c)(1),
(2) Date: Nov. 9, 2023

(87) PCT Pub. No.: WO2022/252873
PCT Pub. Date: Dec. 8, 2022

(65) Prior Publication Data
US 2024/0259549 A1 Aug. 1, 2024

(30) Foreign Application Priority Data

May 31, 2021 (CN) .......................... 202110600932.X

(51) Int. Cl.
*H04N 17/00* (2006.01)
*G06T 7/80* (2017.01)
(52) U.S. Cl.
CPC ............. *H04N 17/002* (2013.01); *G06T 7/80* (2017.01); *G06T 2207/10016* (2013.01)
(58) Field of Classification Search
CPC .................... H04N 17/002; G06T 7/80; G06T 2207/10016
See application file for complete search history.

(56) References Cited

U.S. PATENT DOCUMENTS 10,504,244 B2 12/2019 Bao et al.
10,552,983 B1 * 2/2020 Slobodyanyuk .......... G06T 7/80
(Continued)

FOREIGN PATENT DOCUMENTS

CN 105976391 A 9/2016
CN 108717712 A 10/2018
(Continued)

OTHER PUBLICATIONS

International Search Report and Written Opinion issued Jul. 11, 2022 in International Application No. PCT/CN2022/088716, with English translation (17 pages).
(Continued)

*Primary Examiner* — Brian P Yenke

(57) ABSTRACT

Embodiments of the present disclosure relate to a calibration verification method for a camera intrinsic parameter, an apparatus, a device, and a medium. The method includes: acquiring a plurality of reference images photographed by a target camera with a plurality of reference world coordinates under a preset photographing condition, wherein the camera intrinsic parameter of the target camera is calibrated; determining, a first coordinate change parameter corresponding to the plurality of reference world coordinates according to the preset photographing condition, and determining a second coordinate change parameter of the plurality of reference images according to a preset algorithm; determining whether the second coordinate change parameter is consistent with the first coordinate change parameter; and if the second coordinate change parameter is consistent with the first coordinate change parameter, feeding back a verification message indicating successful calibration of the camera intrinsic parameter.

20 Claims, 8 Drawing Sheets

(56) References Cited

U.S. PATENT DOCUMENTS

| | | | |
|---|---|---|---|
| 2013/0336583 A1* | 12/2013 | Ernst | G06T 7/80 |
| | | | 382/218 |
| 2016/0180510 A1 | 6/2016 | Grau | |
| 2019/0073795 A1* | 3/2019 | Matsuzawa | G06T 7/80 |
| 2019/0096091 A1* | 3/2019 | Bao | G06T 7/85 |
| 2019/0180476 A1 | 6/2019 | Matsuzawa | |
| 2020/0311979 A1* | 10/2020 | Chang | G06T 7/80 |
| 2021/0112190 A1 | 4/2021 | Jia et al. | |
| 2022/0276360 A1* | 9/2022 | Ma | G06T 7/80 |
| 2024/0022830 A1* | 1/2024 | Beziaeva | G06T 1/20 |

FOREIGN PATENT DOCUMENTS

| | | | |
|---|---|---|---|
| CN | 110490938 A | 11/2019 | |
| CN | 110619665 A | 12/2019 | |
| CN | 110689585 A | 1/2020 | |
| CN | 111156997 A | 5/2020 | |
| CN | 111612852 A | 9/2020 | |
| CN | 112184836 A | 1/2021 | |

OTHER PUBLICATIONS

Guan, Fangli et al., "An Improved Fast Camera Calibration Method For Mobile Visual Measurement System," Science of Surveying and Mapping, vol. 44, No. 2, Feb. 28, 2019, pp. 128-135, with English Abstract (9 pages).

Koide, Kenji et al., "General Hand-Eye Calibration Based on Reprojection Error Minimization," IEEE Robotics and Automation Letters, vol. 4, No. 2, Apr. 30, 2019, pp. 1021-1028 (8 pages).

Extended Search Report issued Aug. 22, 2024 in EP Appl. No. 22814920.9 (11 pages).

* cited by examiner

CALIBRATION VERIFICATION METHOD FOR CAMERA INTRINSIC PARAMETER AND APPARATUS, DEVICE, AND MEDIUM

CROSS-REFERENCE TO RELATED APPLICATIONS

The present application is a U.S. National Stage Application under 35 U.S.C. § 371 of International Patent Application No. PCT/CN2022/088716, filed on Apr. 24, 2022, which claims priority of China Patent Application No. 202110600932.X, filed on May 31, 2021, the disclosure of both of which are incorporated by reference herein in entirety.

TECHNICAL FIELD

The present disclosure relates to a calibration verification method for a camera intrinsic parameter, an apparatus, a device and a medium.

BACKGROUND

A camera intrinsic parameter comprises focal length (fx, fy), camera optical center coordinates (cx, cy), time delay between a camera and an inertial navigation device, and the like. Because the camera intrinsic parameter can determine the transformation from camera coordinates to pixel coordinates, the accuracy of camera internal parameter calibration can determine the imaging quality.

In the related art, a chessboard calibration method is used to calibrate the camera intrinsic parameter, and also to verify the camera intrinsic parameter. That is, after completing the calibration of the camera intrinsic parameter with reprojection errors of chessboard corner points in images, the reprojection errors of the chessboard corner points in the images are used as a metric for the verification of the camera intrinsic parameter.

SUMMARY

According to an aspect of the present disclosure, a calibration verification method for a camera intrinsic parameter is provided, the method comprising: obtaining a plurality of reference images captured by a target camera with a plurality of reference world coordinates under a preset photographing condition, wherein the camera intrinsic parameter of the target camera is calibrated; determining a first coordinate change parameter corresponding to the plurality of reference world coordinates based on the preset photographing condition, and determining a second coordinate change parameter of the plurality of reference images based on a preset algorithm; judging whether the second coordinate change parameter is consistent with the first coordinate change parameter; and feeding back a verification message indicating successful calibration of the camera intrinsic parameter if the second coordinate change parameter is consistent with the first coordinate change parameter.

According to another aspect of the present disclosure, a calibration verification apparatus for a camera intrinsic parameter is provided, the calibration verification apparatus comprising: an acquisition module configured to obtain a plurality of reference images captured by a target camera with a plurality of reference world coordinates under a preset photographing condition, wherein the camera intrinsic parameter of the target camera is calibrated; a determination module configured to determine a first coordinate change parameter corresponding to the plurality of reference world coordinates based on the preset photographing condition, and determine a second coordinate change parameter of the plurality of reference images based on a preset algorithm; a judgment module configured to judge whether the second coordinate change parameter is consistent with the first coordinate change parameter; and a verification feedback module configured to feed back a verification message indicating successful calibration of the camera intrinsic parameter in a case where the second coordinate change parameter is consistent with the first coordinate change parameter.

According to another aspect of the present disclosure, a calibration verification system for a camera intrinsic parameter is also provided, the calibration verification system comprising: an upload unit configured to receive a plurality of reference images and/or a video comprising the plurality of reference images, wherein the plurality of reference images and/or the video are uploaded by a user through the calibration verification system, and the plurality of reference images are captured by a target camera with a plurality of reference world coordinates under a preset photographing condition, wherein the camera intrinsic parameter of the target camera is calibrated; a processing unit configured to determine a first coordinate change parameter corresponding to the plurality of reference world coordinates based on the preset photographing condition, determine a second coordinate change parameter of the plurality of reference images based on a preset algorithm, and generate a verification message indicating successful calibration of the camera intrinsic parameter in a case where the second coordinate change parameter is determined to be consistent with the first coordinate change parameter; and a result feedback unit configured to feed back the verification message.

According to another aspect of the present disclosure, an electronic device is also provided, the electronic device comprising: a processor; and a memory configured to store executable instructions for the processor; wherein the processor is configured to read the executable instructions from the memory and execute the executable instructions to implement the calibration verification method for the camera intrinsic parameter provided in the embodiment of the present disclosure.

According to another aspect of the present disclosure, there is also provided a non-transitory computer-readable storage medium on which a computer program is stored, wherein the computer program, when executed by a processor, cause the processor to perform the calibration verification method for the camera intrinsic parameter provided in the embodiment of the present disclosure.

According to another aspect of the present disclosure, a computer program is further provided, the computer program comprising: instructions that, when executed by a processor, cause the processor to perform the calibration verification method for the camera intrinsic parameter provided in the embodiment of the present disclosure.

According to another aspect of the present disclosure, a computer program product is also provided, the computer program product comprising: instructions that, when executed by a processor, cause the processor to perform the calibration verification method for the camera intrinsic parameter provided in the embodiment of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

FIG. 3 (b) is a schematic diagram showing positions of a plurality of reference world coordinates provided in another embodiment of the present disclosure;

FIG. 6 (b) is a schematic diagram of a plurality of reference images provided in another embodiment of the present disclosure;

FIG. 8 (b) is a schematic diagram showing a scenario where a camera intrinsic parameter is applied on a server provided in another embodiment of the present disclosure;

FIG. 8 (c) is a schematic diagram showing a scenario where a camera intrinsic parameter is applied on a server provided in another embodiment of the present disclosure;

DETAILED DESCRIPTION

Figure 1:
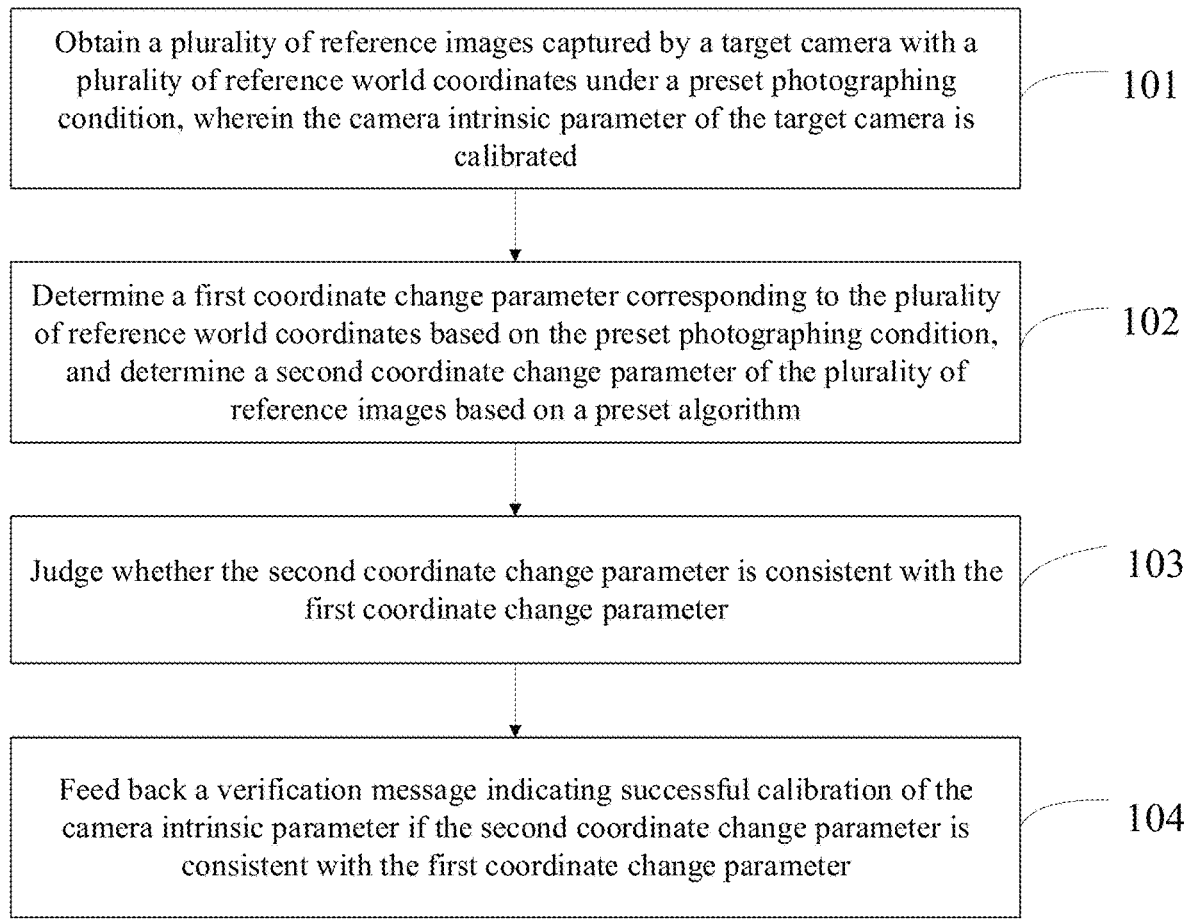
FIG. 1 is a flowchart of a calibration verification method for a camera intrinsic parameter provided in an embodiment of the present disclosure.

Exemplary embodiments of the present disclosure will now be described in detail with reference to the accompanying drawings. Although some embodiments of the present disclosure are shown in the accompanying drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first", "second" and the like mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The inventors of the present disclosure have found that, in the related art, the calibration and verification of camera intrinsic parameter is not independent, and a algorithm in calibration and a algorithm in verification are the same. When the chessboard calibration method results in a larger calibration error, verifying the calibrated camera intrinsic parameter using the same chessboard calibration method may lead to inaccurate verification of the calibration error.

In view of this, an embodiment of the present disclosure provides a calibration verification method for a camera intrinsic parameter to improve the accuracy of the calibration verification of the camera intrinsic parameter, which will be described below in conjunction with specific embodiments.

FIG. 1 is a flowchart of a calibration verification method for a camera intrinsic parameter provided in an embodiment of the present disclosure. The method can be performed by a calibration verification apparatus for a camera intrinsic parameter, wherein the apparatus can be implemented by software and/or hardware, and can generally be integrated in an electronic device that contains a camera, the electronic device comprising, but is not limited to, a smart phone, a wearable device, a laptop computer, or the like.

As shown in FIG. 1, the method comprises steps 101 to 104.

In step 101, a plurality of reference images captured by a target camera with a plurality of reference world coordinates under a preset photographing condition are obtained, wherein the camera intrinsic parameter of the target camera is calibrated.

It should be understood that, the camera intrinsic parameter has already been calibrated before the reference images are captured by the target camera in the embodiment. In the embodiment, the method for calibrating the camera intrinsic parameter may be any algorithm that can achieve camera intrinsic parameter determination, such as Zhang Dingyou's calibration method.

In an embodiment of the present disclosure, a calibration image of a preset calibration object is captured by the target camera, wherein the preset calibration object comprises a calibration point. The preset calibration object may be an object such as a chessboard that can facilitate positioning of the calibration point. Then, standard world coordinates of the calibration point are obtained, wherein the standard world coordinates may be labeled on the preset calibration object in advance. Then, image coordinates of the calibration point in the calibration image are extracted. Because these image coordinates reflect the result of mapping the reference point onto a two-dimensional image, a transformation matrix between the standard world coordinates and the image coordinates can be calculated and used as the camera intrinsic parameter.

In the embodiment, in order to verify the calibration result of the camera intrinsic parameter of the target camera, a photographing condition is preset. A plurality of reference world coordinates under the photographing condition satisfy a certain coordinate change condition, thus facilitating the subsequent coordinate comparison. That is, any number of reference world coordinates under the preset photographing condition are known, which facilitates the subsequent determination of the calibration error based on the plurality of reference world coordinates. Furthermore, in order to obtain the transformation relationship of reference world coordinates on two-dimensional images, the plurality of reference images of a reference object are captured by the target camera with a plurality of reference world coordinates. The plurality of reference world coordinates may be any number of reference world coordinates that satisfy a corresponding photographing condition, and the reference object can be any object. Each reference world coordinate has a corresponding reference image, facilitating the determination of the three-dimension to two-dimension transformation relationship of the target camera.

It should be noted that in different application scenarios, the preset photographing condition described above may be different, resulting in different coordinate relationships between the plurality of reference world coordinates that are set correspondingly, which will be explained in subsequent embodiments and will not be described in detail herein.

In step 102, a first coordinate change parameter corresponding to the plurality of reference world coordinates is determined based on the preset photographing condition, and a second coordinate change parameter of the plurality of reference images is determined based on a preset algorithm.

It can be understood that the coordinate change of the reference object in the world coordinates presented on the reference images reflect the transformation relationship under the influence of the camera intrinsic parameter. Therefore, in the embodiment, the first coordinate change parameter corresponding to the plurality of reference world coordinates is determined based on the preset photographing condition, and the second coordinate change parameter of the plurality of reference images is determined based on a preset algorithm.

It should be noted that the first coordinate change parameter and the second coordinate change parameter in the embodiment can comprise any parameter that can directly or indirectly reflect the coordinate change. For example, it may be a change parameter of the coordinate value itself, or, for example, it may be a change parameter of an area of a reference object related to the coordinate value, etc., which will be described in subsequent embodiments, and will not be repeated herein.

In step 103, it is judged whether the second coordinate change parameter is consistent with the first coordinate change parameter.

In step 104, a verification message indicating successful calibration of the camera intrinsic parameter is fed back if the second coordinate change parameter is consistent with the first coordinate change parameter.

In the embodiment, it is judged whether the second coordinate change parameter is consistent with the first coordinate change parameter. If the second coordinate change parameter is consistent with the first coordinate change parameter, it indicates that the transformation relationship from world coordinates to pixel coordinates of the reference object is stable under the influence of the camera intrinsic parameter. Therefore, the error of the camera intrinsic parameter is within a smaller range, and a verification message indicating successful calibration of the camera intrinsic parameter is fed back.

Therefore, the verification and calibration of the camera intrinsic parameter in the embodiment are two independent processes. When verifying the calibration of the camera parameter, it is performed from a different perspective, i.e., the verification is performed based on coordinate change parameters, thereby achieving decoupling of calibration and verification, improving the accuracy of error verification. Moreover, the verification process is executed in an automated manner and can be applied to a camera production line for calibration verification.

In summary, in the calibration verification method for a camera intrinsic parameter of the embodiment of the present disclosure, a plurality of reference images captured by a target camera with a plurality of reference world coordinates under a preset photographing condition are obtained, wherein the camera intrinsic parameter of the target camera is calibrated. Then, a first coordinate change parameter corresponding to the plurality of reference world coordinates and a second coordinate change parameter of the plurality of reference images are determined. Finally, it is judged whether the second coordinate change parameter is consistent with the first coordinate change parameter. If the second coordinate change parameter is consistent with the first coordinate change parameter, a verification message indicating successful calibration of the camera intrinsic parameter is fed back. Thus, the calibration and verification of camera intrinsic parameter is decoupled, which can improve the accuracy of the calibration verification of the camera intrinsic parameter. In addition, the automatic execution of the calibration verification of the camera intrinsic parameter provides a technical support for the efficiency of the camera intrinsic parameter calibration.

In the embodiment of the present disclosure, since the verification is performed based on the coordinate change parameter, which is a quantitative parameter, when the calibration verification of the camera intrinsic parameter fails, a degree of an error can be directly quantified based on the second coordinate change parameter and the first coordinate change parameter, which can provide a reference for correcting the camera intrinsic parameter.

Figure 2:
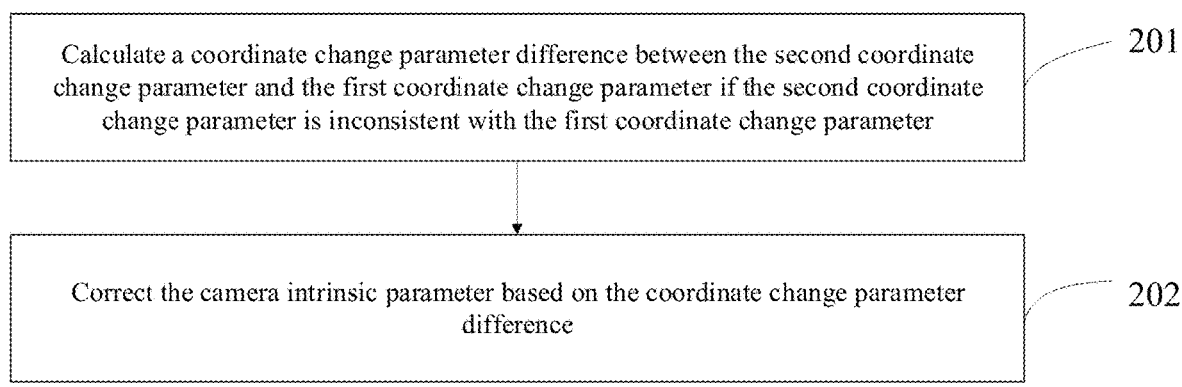
FIG. 2 is a flowchart of another calibration verification method for a camera intrinsic parameter provided in an embodiment of the present disclosure.

In an embodiment of the present disclosure, as shown in FIG. 2, after judging whether the second coordinate change parameter is consistent with the first coordinate change parameter, the method further comprises the following steps.

In step 201, a coordinate change parameter difference between the second coordinate change parameter and the first coordinate change parameter is calculated if the second coordinate change parameter is inconsistent with the first coordinate change parameter.

It can be understood that in the embodiment, the second coordinate change parameter is inconsistent with the first coordinate change parameter, which may be that the difference between the second coordinate change parameter and the first coordinate change parameter is greater than a preset threshold value, etc. . . . In order to quantify degree of inconsistency between the second coordinate change parameter and the first coordinate change parameter, the coordinate change parameter difference between the second coordinate change parameter and the first coordinate change parameter is calculated.

For example, when the second coordinate change parameter and the first coordinate change parameter are coordinate drifts in the Z-axis direction, if the Z-axis coordinate drift corresponding to the first coordinate change parameter is substantially 0, and the Z-axis coordinate drift corresponding to the second coordinate change parameter are relatively large, it is considered that the second coordinate change parameter is inconsistent with the first coordinate change parameter. Therefore, a difference between the Z-axis coordinate drifts corresponding to the second coordinate change parameter and the first coordinate change parameter is used as the coordinate change parameter difference.

In step 202, the camera intrinsic parameter is corrected based on the coordinate change parameter difference.

It should be noted that in different application scenarios, the methods of correcting the camera intrinsic parameter based on the coordinate change parameter difference are different. In some possible embodiments, a corresponding relationship between the coordinate change parameter difference and a correction value of the camera intrinsic parameter can be constructed in advance based on time delay data. The corresponding relationship can be queried to obtain the correction value corresponding to the coordinate change parameter difference, wherein the correction value can be either positive or negative. Then, the corresponding correction value can be added to an original camera intrinsic parameter to obtain a corrected camera intrinsic parameter.

In other possible embodiments, the coordinate change parameter difference is provided as a loss value to a camera intrinsic parameter calibration algorithm, and the camera intrinsic parameter calibration algorithm corrects the camera intrinsic parameter based on the coordinate change parameter difference until verification is passed.

In summary, according to the calibration verification method for a camera intrinsic parameter in the embodiments of the present disclosure, the degree of the error in the camera intrinsic parameter calibration can be quantified when the camera intrinsic parameter verification fails, thereby improving the efficiency of the camera intrinsic parameter calibration.

As described in the above embodiments, the preset photographing condition is related to a coordinate change relationship of the plurality of reference world coordinates. Therefore, it can also be understood that the preset photographing condition can be any condition that arbitrarily specifies a position of the camera at the time of photographing the reference images, which will be explained below with examples.

Example 1

In the example, the preset photographing condition is a coordinate change condition limiting at least one preset dimension of the plurality of reference world coordinates. The coordinate change condition may be a condition under which a coordinate value of the preset dimension is fixed, wherein the preset dimension may be any one or more of the X, Y or Z dimension. In some embodiments, in order to facilitate accurate verification of the camera intrinsic parameter, the preset dimension may be a dimension in which a change relationship between coordinate values of the plurality of reference world coordinates can be easily summarized.

Figure 3A:
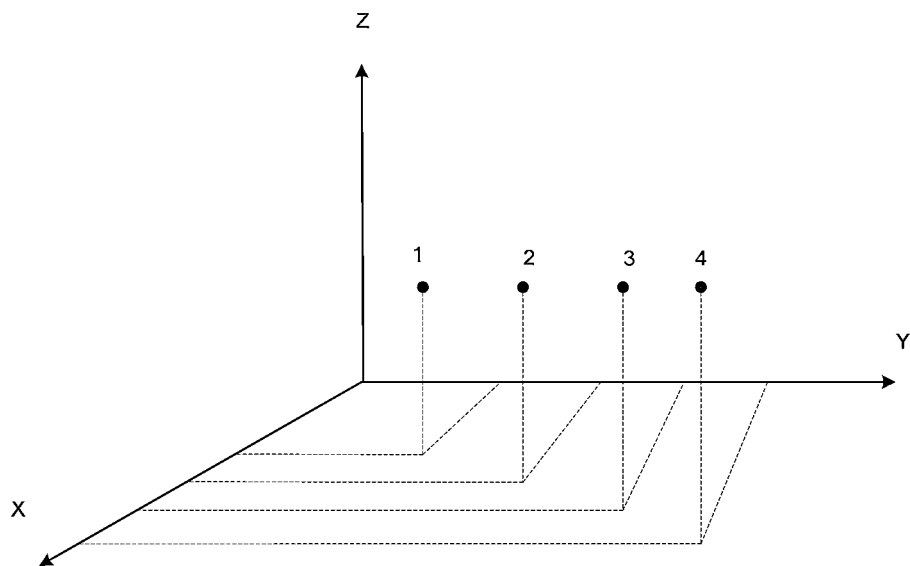
FIG. 3 (a) is a schematic diagram showing positions of a plurality of reference world coordinates provided in an embodiment of the present disclosure.
Figure 3B:
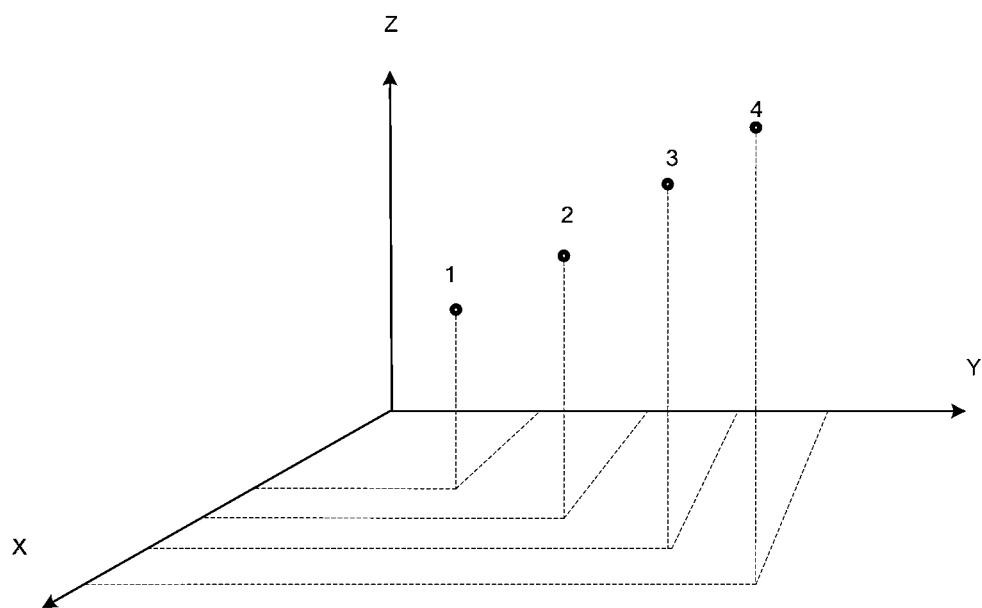

For example, as shown in FIG. 3 (*a*), if the photographing condition is to photograph in a direction where a gravity direction of the camera is unchanged at the time of photographing, it is obvious that the coordinate relationship of the plurality of reference world coordinates is unchanged along the gravity direction.

The coordinate change condition may also be a condition under which a coordinate value of the preset dimension is incremented based on a same incremental value. For example, as shown in FIG. 3 (*b*), the photographing condition is that the gravity direction of the camera increases according to a fixed incremental value during photographing. Therefore, it is obvious that the coordinate relationship of the plurality of reference world coordinates is that the plurality of reference world coordinates rise along the gravity direction based on a certain incremental value.

Example 2

In the example, the preset photographing condition may be to limit a photographing position of the camera based on a preset random distribution function. In the embodiment, the position of the camera is randomly controlled based on the random distribution function to photograph the reference images under the corresponding random reference world coordinates, so that the camera intrinsic parameter can be subsequently calibrated according to whether the changes in the photographing coordinates that are inversely derived from the reference images conform to the regularities of distribution of the random distribution function.

In summary, according to the calibration verification method for a camera intrinsic parameter in the embodiment, the photographing condition can be flexibly set to define the coordinate relationship of the plurality of reference world coordinates, thereby facilitating the subsequent calibration verification of the camera intrinsic parameter.

In order to make it clearer to those skilled in the art, the process of verifying the error of the camera intrinsic parameter based on the first coordinate change parameter and the second coordinate change parameter of the plurality of reference images will be described below with examples where the first coordinate change parameter and the second coordinate change parameter are coordinate values and area values, respectively.

Example 1

In the example, the coordinate change parameter is a coordinate value related to a reference object.

Figure 4:
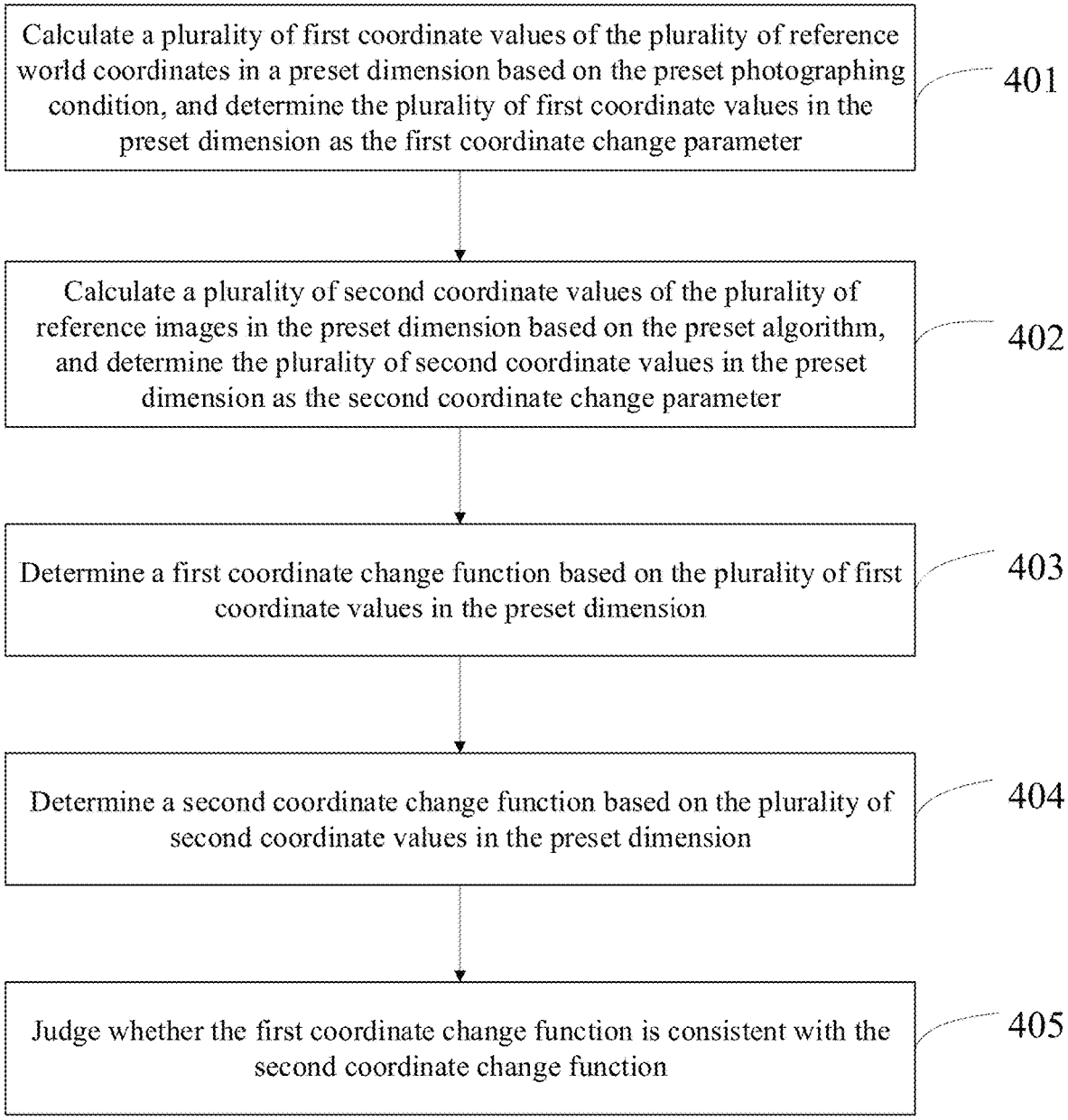
FIG. 4 is a flowchart of another calibration verification method for a camera intrinsic parameter provided in an embodiment of the present disclosure.

As shown in FIG. 4, the determining of the first coordinate change parameter corresponding to the plurality of reference world coordinates and the second coordinate change parameter of the plurality of reference images comprises: steps 401 to 402.

In step 401, a plurality of first coordinate values of the plurality of reference world coordinates in a preset dimension is calculated based on the preset photographing condition, and the plurality of first coordinate values in the preset dimension is determined as the first coordinate change parameter.

The preset dimension may be any one or more of the X, Y, or Z dimension corresponding to the preset photographing condition.

For example, as shown in FIG. 3 (a), if the plurality of reference world coordinates under a preset photographing condition change in a direction where the gravity direction is unchanged, since the Z-axis coordinate values of the plurality of reference world coordinates are almost constant, the preset dimension is a dimension corresponding to the Z axis. For example, as shown in FIG. 3 (b), if the plurality of reference world coordinates under the preset photographing condition increase with a certain ratio along the gravity direction, since the Z-axis coordinate values of the plurality of reference world coordinates change with a fixed ratio, the preset dimension is a dimension corresponding to the Z axis.

In the embodiment, the plurality of first coordinate values in the preset dimension are the first coordinate change parameter. For example, if the preset dimension is a dimension corresponding to the Z axis, the plurality of coordinate values in the Z-axis are used as the first coordinate change parameter.

In step 402, a plurality of second coordinate values of the plurality of reference images in the preset dimension is calculated based on the preset algorithm, and the plurality of second coordinate values in the preset dimension is determined as the second coordinate change parameter.

It is easy to understand that if the error of the camera intrinsic parameter is small, the coordinate change relationship between the second coordinate values of the plurality of reference images in the preset dimension must be consistent with the coordinate change relationship between the plurality of first coordinate values. Therefore, in order to determine the error of the camera intrinsic parameter, the plurality of second coordinate values of the plurality of reference images in the preset dimension are calculated, and the plurality of second coordinate values in the preset dimension are determined as the second coordinate change parameter.

Furthermore, the judging of whether the second coordinate change parameter is consistent with the first coordinate change parameter corresponds to summarizing whether the coordinate relationship corresponding to the plurality of first coordinate values is consistent with the coordinate relationship corresponding to the plurality of second coordinate values. For example, when the plurality of first coordinate values are substantially the same, if the calibrated camera intrinsic parameter is accurate, the corresponding plurality of second coordinate values should also be substantially the same.

Thus, in the embodiment, referring to FIG. 4 again, the method further comprises steps 403 to 405.

In step 403, a first coordinate change function is determined based on the plurality of first coordinate values in the preset dimension.

It should be understood that the first coordinate change function directly summarizes the coordinate change relationship of the plurality of first coordinate values. For example, when the plurality of second coordinate values correspond to the example shown in FIG. 3 (a), the first coordinate change function is $Z1=a$, wherein a is a fixed value of the first coordinate value.

For another example, when the plurality of second coordinate values correspond to the example shown in FIG. 3 (b), the first coordinate change function is $Z1=c+(t-1)$, wherein t is the sequence number of the plurality of reference world coordinates in the queue after they are arranged in the order of the coordinate relations, and c is any fixed value.

In step 404, a second coordinate change function is determined based on the plurality of second coordinate values in the preset dimension.

In the embodiment, the second coordinate change function is determined based on the plurality of second coordinate values in the preset dimension. For example, a linear or nonlinear functional relationship between the plurality of second coordinate values corresponding to the plurality of first coordinate values is calculated.

In step 405, it is judged whether the first coordinate change function is consistent with the second coordinate change function.

In the embodiment, it is judged whether the first coordinate change function is consistent with the second coordinate change function. For example, if the first coordinate change function is $Z1=a$, it is judged whether the second coordinate change function is $Z2=b$, wherein b is any constant value. If not, it is obvious that the first coordinate change function is inconsistent with the second coordinate change function, and the error of the camera intrinsic parameter is considered to be larger. If $Z2=b$, the error of the camera intrinsic parameter is considered to be smaller and the calibration of the camera intrinsic parameter is successful.

For another example, if the first coordinate change function is $Z1=c+(t-1)$, it is judged whether the second coordinate change function is $Z2-d+(t-1)$, wherein t is the sequence number of the plurality of second coordinates in the queue after they are arranged in the order of the corresponding first coordinates, and d is any fixed value. If not, it is obvious that the first coordinate change function is inconsistent with the second coordinate change function, and the error of the camera intrinsic parameter is considered to be larger. If $Z2=d+(t-1)$, the error of the camera intrinsic parameter is considered to be smaller and the calibration of the camera intrinsic parameter is successful.

Example 2

In the example, the coordinate change parameter is an area value related to a reference object.

Figure 5:
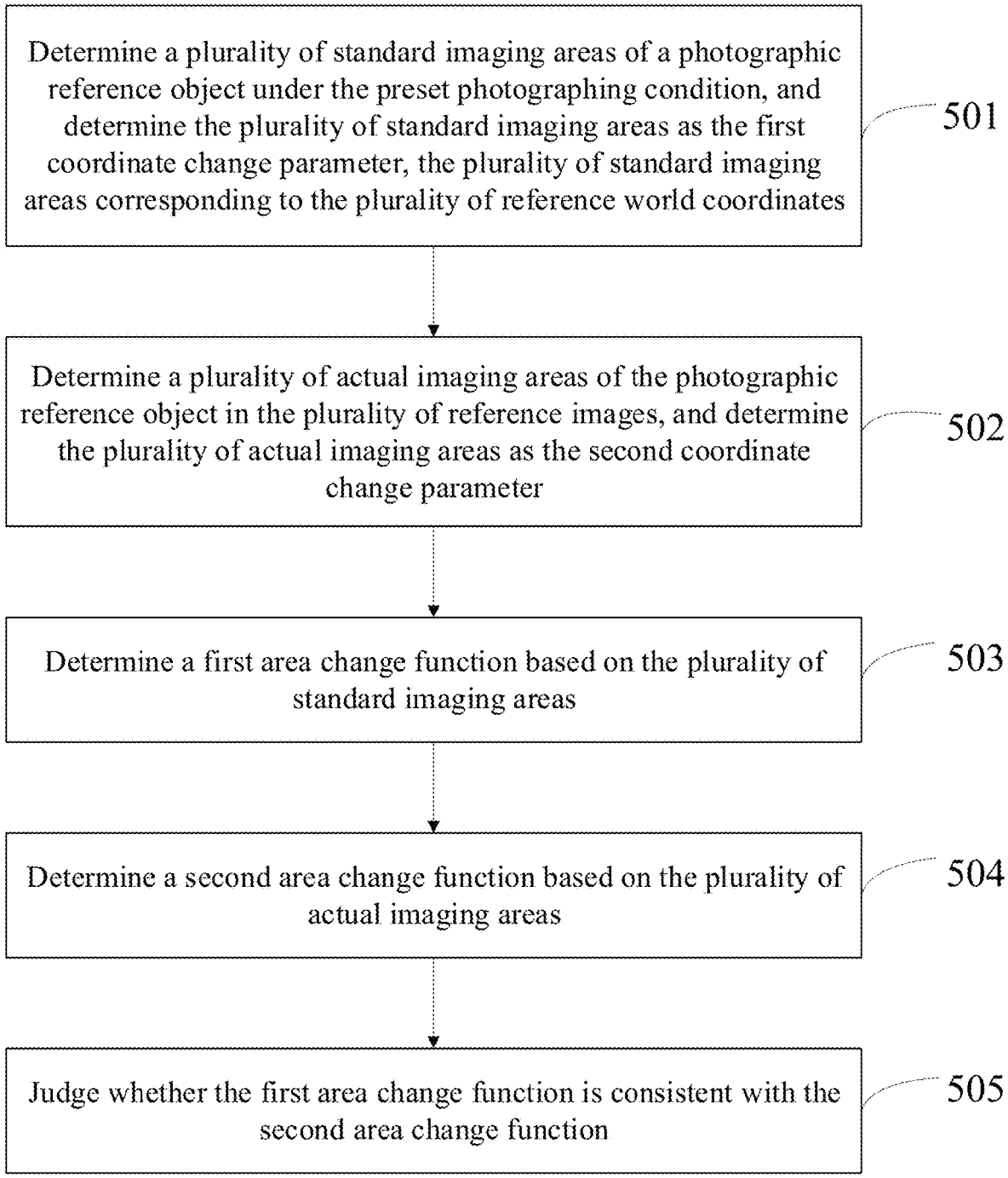
FIG. 5 is a flowchart of another calibration verification method for a camera intrinsic parameter provided in an embodiment of the present disclosure.

As shown in FIG. 5, the determining of the first coordinate change parameter corresponding to the plurality of reference world coordinates and the second coordinate change parameter of the plurality of reference images comprises steps 501 to 502.

In step 501, a plurality of standard imaging areas of a photographic reference object under the preset photographing condition are determined, and the plurality of standard imaging areas are determined as the first coordinate change parameter, the plurality of standard imaging areas corresponding to the plurality of reference world coordinates.

In the embodiment, a plurality of standard imaging areas of a reference object under the preset photographing condition are determined, the plurality of standard imaging areas corresponding to the plurality of reference world coordinates, wherein the standard imaging areas indirectly reflect the change in an imaging area of the reference object when the coordinate values of the plurality of reference world coordinates change under the preset photographing condition. Thus, the determination of the standard imaging area may be any value that corresponds to the change relationship of the coordinate values, and not the true ideal imaging area of the photographic reference object when the camera parameters are free of error.

For example, as shown in FIG. 3 (a), if the plurality of reference world coordinates (four reference world coordinates 1-4 are shown in the figure) change along a direction in which the gravity direction is unchanged, since the Z-axis coordinate values of the plurality of reference world coordinates are almost constant, when a reference object is perpendicular to the Z axis, if the error of the camera intrinsic parameter is small, the corresponding plurality of standard imaging areas are unchanged. Thus, the plurality of standard imaging areas can be determined as any fixed value S1.

For another example, as shown in FIG. 3 (b), if the plurality of reference world coordinates (four reference world coordinates 1-4 are shown in the figure) rise along the gravity direction in accordance with a certain ratio, since the Z-axis coordinate values of the plurality of reference world coordinates change with a fixed ratio, when a reference object is perpendicular to the Z axis, if the error of the camera intrinsic parameter is small, the corresponding plurality of standard imaging areas are reduced in accordance with a certain ratio. Thus, a plurality of values that arbitrarily satisfy the decreasing ratio are determined as the corresponding plurality of standard imaging areas.

In step 502, a plurality of actual imaging areas of the photographic reference object in the plurality of reference images are determined, and the plurality of actual imaging areas are determined as the second coordinate change parameter.

It is easy to understand that if the error of the camera intrinsic parameter is small, the area change relationship between the plurality of actual imaging areas of the plurality of reference images must be consistent with the area change relationship between the plurality of standard imaging areas. Therefore, in order to determine the error of the camera intrinsic parameter, the plurality of actual imaging areas of the plurality of reference images in the preset dimension are calculated, and the actual imaging areas are determined as the second coordinate change parameter.

Furthermore, the judging of whether the second coordinate change parameter is consistent with the first coordinate change parameter corresponds to summarizing whether the area change relationship corresponding to the plurality of actual imaging areas is consistent with the area change relationship corresponding to the corresponding plurality of standard imaging areas. For example, when the plurality of standard imaging areas are the same, if the calibrated camera intrinsic parameter is accurate, the corresponding plurality of actual imaging areas should also be substantially the same.

Thus, in the embodiment, referring to FIG. 5 again, the method further comprises steps 503 to 505.

In step 503, a first area change function is determined based on the plurality of standard imaging areas.

It should be understood that the first coordinate change function indirectly summarizes the coordinate change relationship of the plurality of reference world coordinates under the preset photographing condition. For example, when the plurality of reference world coordinates correspond to the example shown in FIG. 3 (a), and the reference object is located in a direction perpendicular to the Z axis, such as on the ground, the first area change function M1=S1, wherein S1 is an arbitrary constant.

For another example, when the plurality of reference world coordinates correspond to the example shown in FIG. 3 (b), and the reference object is located in a direction perpendicular to the Z axis, such as on the ground, the first area change function M1=S2+(t−1), wherein t is the sequence number of the plurality of standard imaging areas in the queue after they are arranged in coordinate order according to the corresponding reference world coordinates, and S2 is an arbitrary fixed value.

In step 504, a second area change function is determined based on the plurality of actual imaging areas.

In the embodiment, a second area change function is determined based on the plurality of actual imaging areas. For example, a functional relationship of area values between the plurality of actual imaging areas corresponding to the plurality of standard imaging areas is calculated.

In step 505, it is judged whether the first area change function is consistent with the second area change function.

In the embodiment, it is judged whether the first area change function is consistent with the second area change function. For example, if the first area change function is M=S1, it is judged whether the second area change function is M2=S2, wherein S2 is an arbitrary constant value. If not, it is obvious that the first area change function is inconsistent with the second area change function, and the error of the camera intrinsic parameter is considered to be larger. If M2=S2, the error of the camera intrinsic parameter is considered to be smaller and the calibration of the camera intrinsic parameter is successful.

In the embodiment, due to algorithms such as Simultaneous Localization and Mapping (SLAM) can accumulate the drift of the previous image, the area drift of the reference object presented in the image will increase from the first reference image to the last reference image. For example, the camera memory results in larger and larger images of the reference object, the actual imaging areas of the reference object will intuitively become larger and larger.

For example, if the camera memory result in smaller and smaller images of the reference object, the actual imaging areas of the reference object will intuitively become smaller and smaller.

Therefore, in the embodiment, when the first area change function is M=S1, whether the calibration of the camera intrinsic parameter is successful can be intuitively determined based on whether the actual imaging areas in the reference images are the same.

Figure 6A:
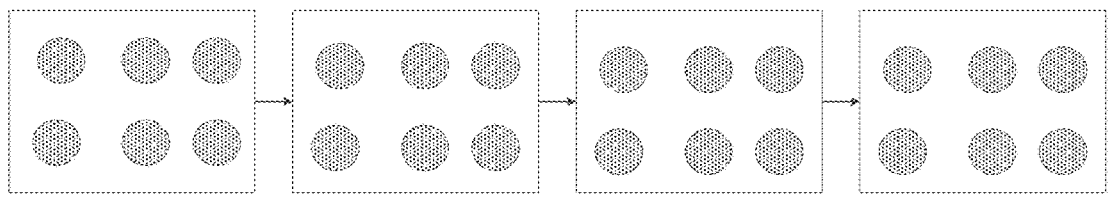
FIG. 6 (a) is a schematic diagram of a plurality of reference images provided in an embodiment of the present disclosure.
Figure 6B:
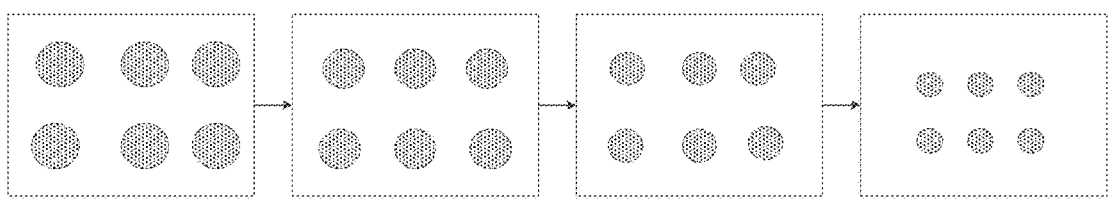

For example, when the plurality of reference world coordinates under the preset photographing condition have a coordinate relationship shown in FIG. 3 (a), and if the reference object is a circular object, whether the calibration of the camera intrinsic parameter is successful can be intuitively determined based on whether the circular images in the corresponding plurality of reference images obtained are consistent. If the plurality of reference images are shown in FIG. 6 (a), the actual imaging areas of the circular object in the corresponding reference images remain almost unchanged, and thereby it can be considered that the calibration of the camera intrinsic parameter is successful. If the plurality of reference images are shown in FIG. 6 (b), the actual imaging areas of the circular object in the corresponding reference images are significantly smaller and smaller, and thereby it can be considered that the calibration of the camera intrinsic parameter is not successful.

In summary, in the calibration verification method for a camera intrinsic parameter of the embodiments of the present disclosure, whether the calibration of the camera intrinsic parameter is successful is verified based on the arbitrary coordinate change parameter that can directly or indirectly reflect the coordinate transformation relationship from the world coordinates to the pixel coordinates of the reference object. This verification method is decoupled from the calibration of the camera intrinsic parameter, thereby improving the accuracy of the verification of the camera intrinsic parameter.

Based on the above embodiments, in order to reduce user learning cost and improve the calibration efficiency of the camera intrinsic parameter, the calibration verification method for the camera intrinsic parameter calibration can also be deployed on a server (a preset calibration verification system). A user can achieve the calibration of the camera intrinsic parameter based on an interaction with a front end of the server, without the need to master the specific calibration method.

In an embodiment of the present disclosure, the plurality of reference images and/or a video comprising the plurality of reference images are obtained, wherein the plurality of reference images and/or the video are uploaded by a user through a preset calibration verification system. In the embodiment, the plurality of reference images may be a plurality of discrete images or may be derived from a video, in which case some successive image frames in the video may be determined as the corresponding plurality of reference images.

In the embodiment, the calibration verification process in the background does not need to be mastered by the user, and a verification result file package of the camera intrinsic parameter corresponding to the plurality of reference images is merely displayed by the calibration verification system, wherein the verification result file package comprises a comparison result of the second coordinate change parameter with the first coordinate change parameter, and thus, the verification result file package is downloaded in response to a request of the user for downloading the verification result file package.

In summary, in the calibration verification method for the camera intrinsic parameter in the embodiment of the present disclosure, the calibration verification method for the camera intrinsic parameter is deployed on a preset calibration verification system. A user can achieve the calibration of the camera intrinsic parameter based on an interaction with a front end of an server, without the need to master the specific calibration method, which may reduce the learning cost of the user and improve the calibration efficiency of the camera intrinsic parameter.

Figure 7:
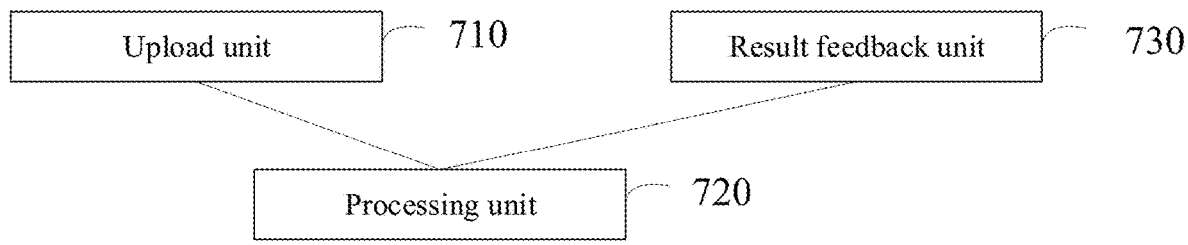
FIG. 7 is a schematic diagram of a structure of a calibration verification system for a camera intrinsic parameter provided in an embodiment of the present disclosure.

A calibration verification system for a camera intrinsic parameter provided in an embodiment of the present disclosure will be specifically described below. FIG. 7 is a schematic diagram of a structure of a calibration verification system for a camera intrinsic parameter provided in an embodiment of the present disclosure. As shown in FIG. 7, the calibration verification system for the camera intrinsic parameter comprises an upload unit 710, a processing unit 720, and a result feedback unit 730.

The upload unit 710 is configured to receive a plurality of reference images and/or a video comprising the plurality of reference images, wherein the plurality of reference images and/or the video are uploaded by a user through the calibration verification system, and the plurality of reference images are captured by a target camera with a plurality of reference world coordinates under a preset photographing condition, wherein the camera intrinsic parameter of the target camera is calibrated.

Figure 8A:
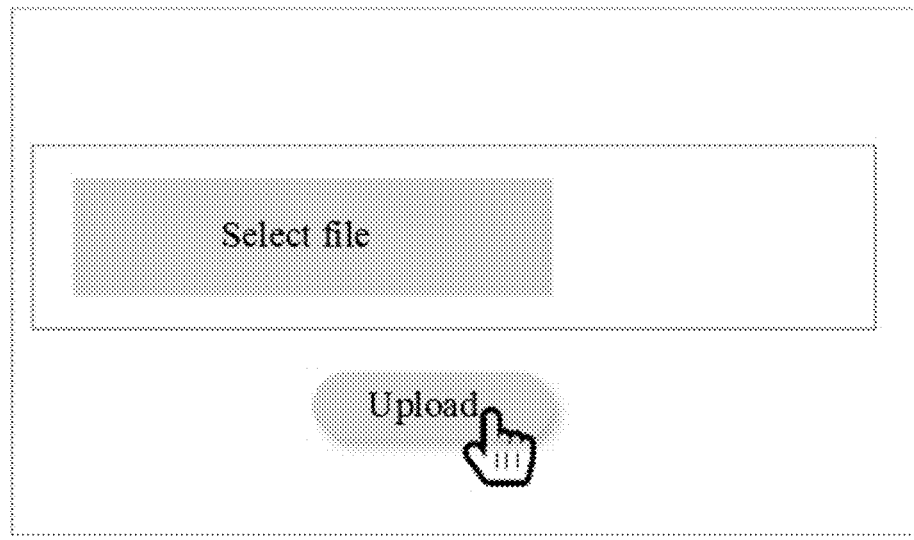
FIG. 8 (a) is a schematic diagram showing a scenario where a camera intrinsic parameter is applied on a server provided in an embodiment of the present disclosure.
Figure 8B:
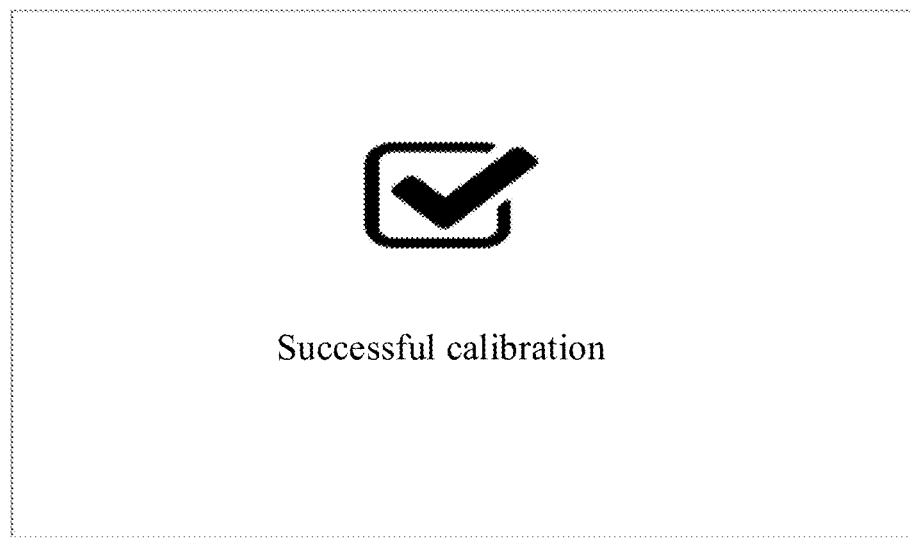
Figure 8C:
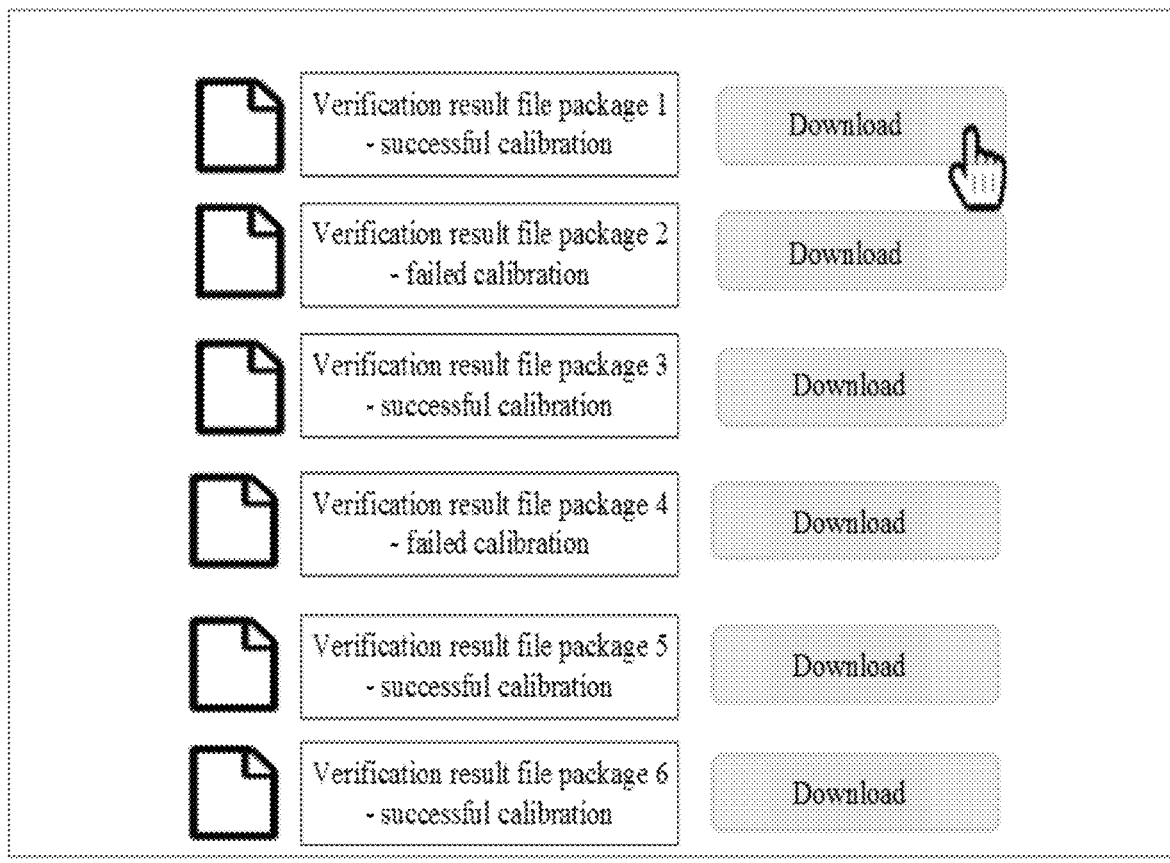

In an embodiment of the present disclosure, in order to facilitate the operation of the user, the upload unit 710 further provides a visual front-end upload operation interface that can be used by the user to upload an image or a video, for example, as shown in FIG. 8 (a). The upload operation interface comprises an upload control for uploading the plurality of reference images and/or a video. When the upload control is triggered, the plurality of reference images of a reference object captured on the basis of a plurality of reference world coordinates under a preset photographing condition can be uploaded.

Furthermore, the processing unit 720 executes the calibration verification process of the camera intrinsic parameter in the background in the embodiment, determines a first coordinate change parameter corresponding to the plurality of reference world coordinates based on the preset photographing condition, determines a second coordinate change parameter of the plurality of reference images based on a preset algorithm, and generates a verification message indicating successful calibration of the camera intrinsic parameter in a case where the second coordinate change parameter is determined to be consistent with the first coordinate change parameter.

After the verification is completed, the result feedback unit 730 can directly visualize the verification result on a verification result display interface through front-end visualization. For example, as shown in FIG. 8 (b), when it is verified that the second coordinate change parameter is consistent with the first coordinate change parameter, a verification message "Calibration successful" is displayed. The calibration verification for a camera intrinsic parameter can be performed without the need for the user to master the specific verification method, which can reduce the learning cost of the calibration verification for the camera intrinsic parameter, improve the efficiency of the calibration verification for the camera intrinsic parameter, and provide a technical support for the large-scale calibration verification of the camera intrinsic parameter.

In the embodiment, the verification result may also be directly displayed to the user visually in the form of a file package in the relevant interface by the result feedback unit 730. When the calibration verification algorithm for the camera intrinsic parameter is deployed on a system end, large-scale operation can be achieved for the calibration verification of the camera intrinsic parameter, and the verification result can be visually displayed to the user in the form of the file package.

As shown in FIG. 8 (c), a plurality of verification result file packages are provided on a verification result interface. A name of each verification result file package can contain a character mark indicating whether the verification is successful, and each verification result file package contains a download control. The verification result file package can be downloaded through the download control. The verification result file package can comprise the second coordinate change parameter, the first coordinate change parameter and the coordinate change parameter difference which correspond to the target camera. In the embodiment, the verification result file package can be downloaded in response to a request of the user for downloading the verification result file package.

In summary, the calibration verification system for the camera intrinsic parameter in the embodiment of the present disclosure can interact with a user through front-end visualization in the calibration for the camera intrinsic parameter. The calibration verification algorithm for the camera intrinsic parameter is deployed on the system end to achieve large-scale operation of the calibration verification for the camera intrinsic parameter.

Figure 9:
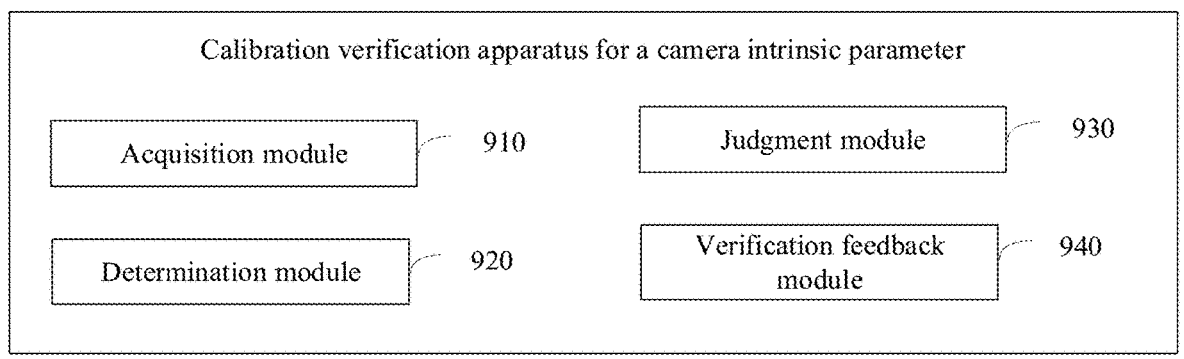
FIG. 9 is a schematic diagram of a structure of a calibration verification apparatus for a camera intrinsic parameter provided in an embodiment of the present disclosure.

FIG. 9 is a schematic diagram of a structure of a calibration verification apparatus for a camera intrinsic parameter provided in an embodiment of the present disclosure. The apparatus can be implemented by software and/or hardware, can generally be integrated into an electronic device, and is used for the calibration verification of the camera intrinsic parameter. As shown in FIG. 9, the apparatus comprises: an acquisition module 910, a determination module 920, a judgment module 930, and a verification feedback module 940.

The acquisition module 910 is configured to obtain a plurality of reference images captured by a target camera with a plurality of reference world coordinates under a preset photographing condition, wherein the camera intrinsic parameter of the target camera is calibrated.

The determination module 920 is configured to determine a first coordinate change parameter corresponding to the plurality of reference world coordinates based on the preset photographing condition, and determine a second coordinate change parameter of the plurality of reference images based on a preset algorithm.

The judgment module 930 is configured to judge whether the second coordinate change parameter is consistent with the first coordinate change parameter.

The verification feedback module 940 is configured to feed back a verification message indicating successful calibration of the camera intrinsic parameter in a case where the second coordinate change parameter is consistent with the first coordinate change parameter.

The calibration verification apparatus for the camera intrinsic parameter provided in the embodiment of the present disclosure can perform the calibration verification method for the camera intrinsic parameter provided in any embodiment of the present disclosure, and has corresponding functional modules to perform the method and achieve the beneficial effect.

In order to implement the above embodiment, the present disclosure further provides a computer program product comprising a computer program/instructions that, when executed by a processor, implement the calibration verification method for the camera intrinsic parameter in the embodiment described above.

In order to implement the above embodiment, the present disclosure further provides a computer program, comprising: instructions that, when executed by a processor, cause the processor to perform the calibration verification method for the camera intrinsic parameter provided in the embodiment described above.

Figure 10:
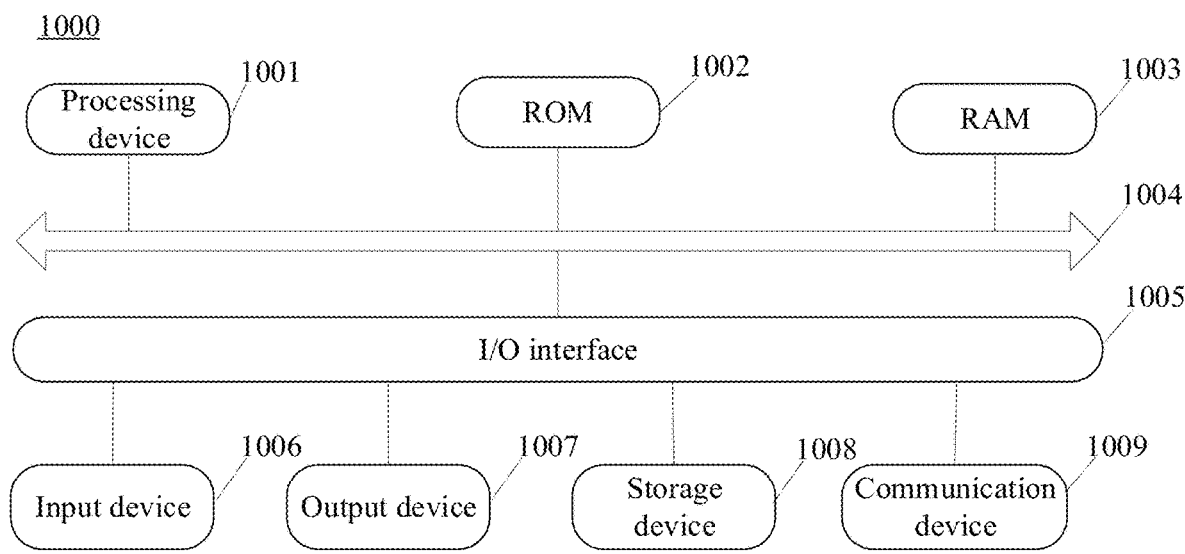
FIG. 10 is a schematic diagram of a structure of an electronic device provided in an embodiment of the present disclosure.

FIG. 10 is a schematic diagram of a structure of an electronic device provided in an embodiment of the present disclosure.

Referring to FIG. 10, a schematic diagram suitable for implementing a structure of an electronic device 1000 the embodiments of the present disclosure is shown. The electronic device 1000 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, or the like. The electronic device shown in FIG. 10 is merely an example and should not impose any limitation on the function and scope of the embodiment of the present disclosure.

As shown in FIG. 10, the electronic device 1000 may comprise a processing device (e.g., a central processing unit, a graphics processor, or the like) 1001, which may perform various appropriate actions and processes according to a program stored in Read Only Memory (ROM) 1002 or a program loaded from a storage device 1008 into Random Access Memory (RAM) 1003. In RAM 1003, various programs and data required for the operation of the electronic device 1000 are also stored. The processing device 1001, ROM 1002, and RAM 1003 are connected to each other through a bus 1004. An input/output (I/O) interface 1005 is also connected to the bus 1004.

Generally, the following devices can be connected to the I/O interface 1005: an input device 1006 comprising, for example, a touch screen, a touch pad, a keyboard, a mouse, a camera, a microphone, an accelerometer, a gyroscope, etc.; an output device 1007 comprising, for example, a liquid crystal display (LCD), a speaker, a vibrator, etc.; a storage device 1008 such as a magnetic tape, a hard disk, etc.; and a communication device 1009. The communication device 1009 enables the electronic device 1000 to communicate wirelessly or in wired communication with other devices to exchange data. Although FIG. 10 shows the electronic device 1000 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1009, or installed from the storage device 1008, or from the ROM 1002. When the computer program is executed by the processing device 1001, the above functions defined in the calibration verification method for a camera intrinsic parameter of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that, when executed by the electronic device, cause the electronic device to: obtain a plurality of reference images captured by a target camera with a plurality of reference world coordinates under a preset photographing condition, wherein the camera intrinsic parameter of the target camera is calibrated; determine a first coordinate change parameter corresponding to the plurality of reference world coordinates based on the preset photographing condition, and determine a second coordinate change parameter of the plurality of reference images based on a preset algorithm; judge whether the second coordinate change parameter is consistent with the first coordinate change parameter; and feed back a verification message indicating successful calibration of the camera intrinsic parameter if the second coordinate change parameter is consistent with the first coordinate change parameter. Thus, the calibration and verification of the camera intrinsic parameter are decoupled, which can improve the accuracy of the calibration verification of the camera intrinsic parameter. In addition, the automatic execution of the calibration verification of the camera intrinsic parameter provides a technical support for the efficient of the calibration of the camera intrinsic parameter.

The computer program code for executing operations of the present disclosure may be written in one or more program design languages or combinations thereof, the program design languages comprising but not limited to object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or a server. In the case of a remote computer, the remote computer may be connected to the user computer through any kind of network, comprising a local area network (LAN) or a wide area network (WAN), or connected to an external computer (for example using an Internet service provider via Internet).

The flowcharts and block diagrams in the accompanying drawings illustrate the architecture, functionality, and operation of some possible implementations of apparatus, methods and computer program products in accordance with various embodiments of the present disclosure. In this regard, each block in the flowchart or block diagrams may represent a module, a segment, or a portion of code, which comprises one or more executable instructions for implementing the specified function. It should also be noted that, in some alternative implementations, the functions noted in the block may occur in a different order than those labeled in the accompanying drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. A more specific example of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides a calibration verification method for a camera intrinsic parameter, comprising: obtaining a plurality of reference images captured by a target camera with a plurality of reference world coordinates under a preset photographing condition, wherein the camera intrinsic parameter of the target camera is calibrated; determining a first coordinate change parameter corresponding to the plurality of reference world coordinates based on the preset photographing condition, and determining a second coordinate change parameter of the plurality of reference images based on a preset algorithm; judging whether the second coordinate change parameter is consistent with the first coordinate change parameter; and feeding back a verification message indicating successful calibration of the camera intrinsic parameter if the second coordinate change parameter is consistent with the first coordinate change parameter.

According to one or more embodiments of the present disclosure, the method further comprises: capturing a calibration image of a preset calibration object by the target camera before the obtaining of the plurality of reference images captured by the target camera with the plurality of reference world coordinates under the preset photographing condition, wherein the preset calibration object comprises a calibration point; obtaining standard world coordinates of the calibration point and image coordinates of the calibration point in the calibration image; and calculating the camera intrinsic parameter based on the standard world coordinates and the image coordinates.

According to one or more embodiments of the present disclosure, the preset photographing condition comprises: a coordinate change condition in at least one preset dimension of the plurality of reference world coordinates.

According to one or more embodiments of the present disclosure, the coordinate change condition comprises: a condition under which a coordinate value of the preset dimension is fixed; or a condition under which a coordinate value of the preset dimension is incremented based on a same incremental value.

According to one or more embodiments of the present disclosure, the determining of the first coordinate change parameter corresponding to the plurality of reference world coordinates based on the preset photographing condition, and the determining of the second coordinate change parameter of the plurality of reference images based on the preset algorithm comprises: calculating a plurality of first coordinate values of the plurality of reference world coordinates in a preset dimension based on the preset photographing condition, and determining the plurality of first coordinate values in the preset dimension as the first coordinate change parameter; and calculating a plurality of second coordinate values of the plurality of reference images in the preset dimension based on the preset algorithm, and determining the plurality of second coordinate values in the preset dimension as the second coordinate change parameter.

According to one or more embodiments of the present disclosure, the judging of whether the second coordinate change parameter is consistent with the first coordinate change parameter comprises: determining a first coordinate change function based on the plurality of first coordinate values in the preset dimension; determining a second coordinate change function based on the plurality of second coordinate values in the preset dimension; and judging whether the first coordinate change function is consistent with the second coordinate change function.

According to one or more embodiments of the present disclosure, the determining of the first coordinate change parameter corresponding to the plurality of reference world coordinates based on the preset photographing condition, and the determining of the second coordinate change parameter of the plurality of reference images based on the preset algorithm comprises: determining a plurality of standard imaging areas of a photographic reference object under the preset photographing condition, and determining the plurality of standard imaging areas as the first coordinate change parameter, the plurality of standard imaging areas corresponding to the plurality of reference world coordinates; and determining a plurality of actual imaging areas of the photographic reference object in the plurality of reference images, and determining the plurality of actual imaging areas as the second coordinate change parameter.

According to one or more embodiments of the present disclosure, the judging of whether the second coordinate change parameter is consistent with the first coordinate change parameter comprises: determining a first area change function based on the plurality of standard imaging areas; determining a second area change function based on the plurality of actual imaging areas; and judging whether the first area change function is consistent with the second area change function.

According to one or more embodiments of the present disclosure, the method further comprises: after judging whether the second coordinate change parameter is consistent with the first coordinate change parameter, calculating a coordinate change parameter difference between the second coordinate change parameter and the first coordinate change parameter if the second coordinate change parameter is inconsistent with the first coordinate change parameter; and correcting the camera intrinsic parameter based on the coordinate change parameter difference.

According to one or more embodiments of the present disclosure, the obtaining of the plurality of reference images captured by the target camera under the condition of the plurality of reference world coordinates under the preset photographing condition comprises: obtaining the plurality of reference images and/or a video comprising the plurality of reference images, wherein the plurality of reference images and/or the video are uploaded by a user through a preset calibration verification system.

According to one or more embodiments of the present disclosure, the method further comprises: displaying a verification result file package of the camera intrinsic parameter corresponding to the plurality of reference images by the calibration verification system, wherein the verification result file package comprises a comparison result of the second coordinate change parameter with the first coordinate change parameter; and downloading the verification result file package in response to a request of the user for downloading the verification result file package.

According to one or more embodiments of the present disclosure, the present disclosure provides a calibration verification apparatus for a camera intrinsic parameter, comprising: an acquisition module configured to obtain a plurality of reference images captured by a target camera with a plurality of reference world coordinates under a preset photographing condition, wherein the camera intrinsic parameter of the target camera is calibrated; a determination module configured to determine a first coordinate change parameter corresponding to the plurality of reference world coordinates based on the preset photographing condition, and determine a second coordinate change parameter of the plurality of reference images based on a preset algorithm; a judgment module configured to judge whether the second coordinate change parameter is consistent with the first coordinate change parameter; and a verification feedback module configured to feed back a verification message indicating successful calibration of the camera intrinsic parameter in a case where the second coordinate change parameter is consistent with the first coordinate change parameter.

According to one or more embodiments of the present disclosure, the calibration verification apparatus for the camera intrinsic parameter provided by the present disclosure further comprises: a calibration module configured to: capture a calibration image of a preset calibration object by the target camera, wherein the preset calibration object comprises a calibration point; obtain standard world coordinates of the calibration point and image coordinates of the calibration point in the calibration image; and calculate the camera intrinsic parameter based on the standard world coordinates and the image coordinates.

According to one or more embodiments of the present disclosure, in the calibration verification apparatus for the camera intrinsic parameter provided by the present disclosure, the preset photographing condition comprises: a coordinate change condition in at least one preset dimension of the plurality of reference world coordinates.

According to one or more embodiments of the present disclosure, in the calibration verification apparatus for the camera intrinsic parameter provided by the present disclosure, the coordinate change condition comprises: a condition under which a coordinate value of the preset dimension is fixed; or a condition under which a coordinate value of the preset dimension is incremented based on a same incremental value.

According to one or more embodiments of the present disclosure, in the calibration verification apparatus for the camera intrinsic parameter provided by the present disclosure, the determination module is configured to: calculate a plurality of first coordinate values of the plurality of reference world coordinates in a preset dimension based on the preset photographing condition, and determine the plurality of first coordinate values in the preset dimension as the first coordinate change parameter; and calculate a plurality of second coordinate values of the plurality of reference images in the preset dimension based on the preset algorithm, and determine the plurality of second coordinate values in the preset dimension as the second coordinate change parameter.

According to one or more embodiments of the present disclosure, in the calibration verification apparatus for the camera intrinsic parameter provided by the present disclosure, the judgment module is configured to: determine a first coordinate change function based on the plurality of first coordinate values in the preset dimension; determine a second coordinate change function based on the plurality of second coordinate values in the preset dimension; and judge whether the first coordinate change function is consistent with the second coordinate change function.

According to one or more embodiments of the present disclosure, in the calibration verification apparatus for the camera intrinsic parameter provided by the present disclosure, the determination module is configured to: determine a plurality of standard imaging areas of a photographic reference object under the preset photographing condition, and determine the plurality of standard imaging areas as the first coordinate change parameter, the plurality of standard imaging areas corresponding to the plurality of reference world coordinates; and determine a plurality of actual imaging areas of the photographic reference object in the plurality of reference images, and determine the plurality of actual imaging areas as the second coordinate change parameter.

According to one or more embodiments of the present disclosure, in the calibration verification apparatus for the camera intrinsic parameter provided by the present disclosure, the judgment module is configured to: determine a first area change function based on the plurality of standard imaging areas; determine a second area change function based on the plurality of actual imaging areas; and judge whether the first area change function is consistent with the second area change function.

According to one or more embodiments of the present disclosure, the calibration verification apparatus for the camera intrinsic parameter provided by the present disclosure further comprises: a calculation module configured to calculate a coordinate change parameter difference between the second coordinate change parameter and the first coordinate change parameter in a case where the second coordinate change parameter is inconsistent with the first coordinate change parameter; and a correction module configured to correct the camera intrinsic parameter based on the coordinate change parameter difference.

According to one or more embodiments of the present disclosure, the calibration verification apparatus for the camera intrinsic parameter provided by the present disclosure further comprises: an upload module configured to obtain the plurality of reference images and/or a video comprising the plurality of reference images, wherein the plurality of reference images and/or the video are uploaded by a user through a preset calibration verification system.

According to one or more embodiments of the present disclosure, the calibration verification apparatus for the camera intrinsic parameter provided by the present disclosure further comprises: a download module configured to display a verification result file package of the camera intrinsic parameter corresponding to the plurality of reference images by the calibration verification system, and download the verification result file package in response to a request of the user for downloading the verification result file package, wherein the verification result file package comprises a comparison result of the second coordinate change parameter with the first coordinate change parameter.

According to one or more embodiments of the present disclosure, the present disclosure provides an electronic device, comprising: a processor; and a memory configured to store executable instructions for the processor; wherein the processor is configured to read the executable instructions from the memory and execute the executable instructions to implement the calibration verification method for the camera intrinsic parameter provided in any embodiment of the present disclosure.

According to one or more embodiments of the present disclosure, the present disclosure provides a non-transitory computer-readable storage medium on which a computer program is stored, wherein the computer program, when executed by a processor, cause the processor to perform the calibration verification method for the camera intrinsic parameter provided in any embodiment of the present disclosure.

According to one or more embodiments of the present disclosure, the present disclosure provides a computer program, comprising: instructions that, when executed by a processor, cause the processor to perform the calibration verification method for the camera intrinsic parameter provided in any embodiment of the present disclosure.

According to one or more embodiments of the present disclosure, the present disclosure provides a computer program product, comprising: instructions that, when executed by a processor, cause the processor to perform the calibration verification method for the camera intrinsic parameter provided in any embodiment of the present disclosure.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A calibration verification method for a camera intrinsic parameter, comprising:
   obtaining a plurality of reference images captured by a target camera with a plurality of reference world coordinates under a preset photographing condition, wherein the camera intrinsic parameter of the target camera is calibrated;
   determining a first coordinate change parameter corresponding to the plurality of reference world coordinates based on the preset photographing condition, and determining a second coordinate change parameter of the plurality of reference images based on a preset algorithm;
   judging whether the second coordinate change parameter is consistent with the first coordinate change parameter; and
   feeding back a verification message indicating successful calibration of the camera intrinsic parameter if the second coordinate change parameter is consistent with the first coordinate change parameter.

2. The calibration verification method according to claim 1, further comprising:
   capturing a calibration image of a preset calibration object by the target camera before the obtaining of the plurality of reference images captured by the target camera with the plurality of reference world coordinates under the preset photographing condition, wherein the preset calibration object comprises a calibration point;
   obtaining standard world coordinates of the calibration point and image coordinates of the calibration point in the calibration image; and
   calculating the camera intrinsic parameter based on the standard world coordinates and the image coordinates.

3. The calibration verification method according to claim 1, wherein the preset photographing condition comprises: a coordinate change condition in at least one preset dimension of the plurality of reference world coordinates.

4. The calibration verification method according to claim 3, wherein the coordinate change condition comprises:
   a condition under which a coordinate value of the preset dimension is fixed; or
   a condition under which a coordinate value of the preset dimension is incremented based on a same incremental value.

5. The calibration verification method according to claim 1, wherein the determining of the first coordinate change parameter corresponding to the plurality of reference world coordinates based on the preset photographing condition, and the determining of the second coordinate change parameter of the plurality of reference images based on the preset algorithm comprises:
   calculating a plurality of first coordinate values of the plurality of reference world coordinates in a preset dimension based on the preset photographing condition, and determining the plurality of first coordinate values in the preset dimension as the first coordinate change parameter; and
   calculating a plurality of second coordinate values of the plurality of reference images in the preset dimension based on the preset algorithm, and determining the plurality of second coordinate values in the preset dimension as the second coordinate change parameter.

6. The calibration verification method according to claim 5, wherein the judging of whether the second coordinate change parameter is consistent with the first coordinate change parameter comprises:
   determining a first coordinate change function based on the plurality of first coordinate values in the preset dimension;
   determining a second coordinate change function based on the plurality of second coordinate values in the preset dimension; and
   judging whether the first coordinate change function is consistent with the second coordinate change function.

7. The calibration verification method according to claim 1, wherein the determining of the first coordinate change parameter corresponding to the plurality of reference world coordinates based on the preset photographing condition, and the determining of the second coordinate change parameter of the plurality of reference images based on the preset algorithm comprises:
   determining a plurality of standard imaging areas of a photographic reference object under the preset photographing condition, and determining the plurality of standard imaging areas as the first coordinate change parameter, the plurality of standard imaging areas corresponding to the plurality of reference world coordinates; and
   determining a plurality of actual imaging areas of the photographic reference object in the plurality of reference images, and determining the plurality of actual imaging areas as the second coordinate change parameter.

8. The calibration verification method according to claim 7, wherein the judging of whether the second coordinate change parameter is consistent with the first coordinate change parameter comprises:
   determining a first area change function based on the plurality of standard imaging areas;
   determining a second area change function based on the plurality of actual imaging areas; and
   judging whether the first area change function is consistent with the second area change function.

9. The calibration verification method according to claim 1, further comprising:
   after judging whether the second coordinate change parameter is consistent with the first coordinate change parameter, calculating a coordinate change parameter difference between the second coordinate change parameter and the first coordinate change parameter if the second coordinate change parameter is inconsistent with the first coordinate change parameter; and
   correcting the camera intrinsic parameter based on the coordinate change parameter difference.

10. The calibration verification method according to claim 1, wherein the obtaining of the plurality of reference images captured by the target camera under the condition of the plurality of reference world coordinates under the preset photographing condition comprises:
    obtaining the plurality of reference images and/or a video comprising the plurality of reference images, wherein the plurality of reference images and/or the video are uploaded by a user through a preset calibration verification system.

11. The calibration verification method according to claim 10, further comprising:
displaying a verification result file package of the camera intrinsic parameter corresponding to the plurality of reference images by the calibration verification system, wherein the verification result file package comprises a comparison result of the second coordinate change parameter with the first coordinate change parameter; and
downloading the verification result file package in response to a request of the user for downloading the verification result file package.

12. A calibration verification system for a camera intrinsic parameter, comprising:
an upload unit configured to receive a plurality of reference images and/or a video comprising the plurality of reference images, wherein the plurality of reference images and/or the video are uploaded by a user through the calibration verification system, and the plurality of reference images are captured by a target camera with a plurality of reference world coordinates under a preset photographing condition, wherein the camera intrinsic parameter of the target camera is calibrated;
a processing unit configured to determine a first coordinate change parameter corresponding to the plurality of reference world coordinates based on the preset photographing condition, determine a second coordinate change parameter of the plurality of reference images based on a preset algorithm, and generate a verification message indicating successful calibration of the camera intrinsic parameter in a case where the second coordinate change parameter is determined to be consistent with the first coordinate change parameter; and
a result feedback unit configured to feed back the verification message.

13. The calibration verification system according to claim 12, wherein the result feedback unit is further configured to: display a verification result file package corresponding to the verification message, wherein the verification result file package comprises a comparison result of the second coordinate change parameter with the first coordinate change parameter; and download the verification result file package in response to a request of the user for downloading the verification result file package.

14. An electronic device, comprising:
a processor; and
a memory configured to store executable instructions for the processor;
wherein the processor is configured to read the executable instructions from the memory and execute the executable instructions to:
obtain a plurality of reference images captured by a target camera with a plurality of reference world coordinates under a preset photographing condition, wherein the camera intrinsic parameter of the target camera is calibrated;
determine a first coordinate change parameter corresponding to the plurality of reference world coordinates based on the preset photographing condition, and determine a second coordinate change parameter of the plurality of reference images based on a preset algorithm;
judge whether the second coordinate change parameter is consistent with the first coordinate change parameter; and
feed back a verification message indicating successful calibration of the camera intrinsic parameter if the second coordinate change parameter is consistent with the first coordinate change parameter.

15. The electronic device according to claim 14, wherein the processor is further configured to execute the executable instructions to:
capture a calibration image of a preset calibration object by the target camera, wherein the preset calibration object comprises a calibration point;
obtain standard world coordinates of the calibration point and image coordinates of the calibration point in the calibration image; and
calculate the camera intrinsic parameter based on the standard world coordinates and the image coordinates.

16. The electronic device according to claim 14, wherein the preset photographing condition comprises: a coordinate change condition in at least one preset dimension of the plurality of reference world coordinates.

17. The electronic device according to claim 16, wherein the coordinate change condition comprises:
a condition under which a coordinate value of the preset dimension is fixed; or
a condition under which a coordinate value of the preset dimension is incremented based on a same incremental value.

18. The electronic device according to claim 14, wherein the processor is configured to execute the executable instructions to:
calculate a plurality of first coordinate values of the plurality of reference world coordinates in a preset dimension based on the preset photographing condition, and determine the plurality of first coordinate values in the preset dimension as the first coordinate change parameter; and
calculate a plurality of second coordinate values of the plurality of reference images in the preset dimension based on the preset algorithm, and determine the plurality of second coordinate values in the preset dimension as the second coordinate change parameter.

19. The electronic device according to claim 18, wherein the processor is configured to execute the executable instructions to:
determine a first coordinate change function based on the plurality of first coordinate values in the preset dimension;
determine a second coordinate change function based on the plurality of second coordinate values in the preset dimension; and
judge whether the first coordinate change function is consistent with the second coordinate change function.

20. A non-transitory computer-readable storage medium on which a computer program is stored, wherein the computer program, when executed by a processor, cause the processor to perform the calibration verification method for the camera intrinsic parameter according to claim 1.

* * * * *